Sept. 13, 1966 H. C. A. VAN DUUREN 3,272,921

SIMPLEX TELEGRAPH SYSTEM FOR SCANNING ANSWER-BACK SIGNALS

Filed Nov. 1, 1962 3 Sheets-Sheet 1

INVENTOR.
H. C. A. van DUUREN

BY [signature]

ATTORNEY

SIMPLEX TELEGRAPH SYSTEM FOR SCANNING ANSWER-BACK SIGNALS

INVENTOR.
H. C. A. van DUUREN
BY Hugh A. Kirk
ATTORNEY

Sept. 13, 1966 H. C. A. VAN DUUREN 3,272,921

SIMPLEX TELEGRAPH SYSTEM FOR SCANNING ANSWER-BACK SIGNALS

Filed Nov. 1, 1962 3 Sheets-Sheet 3

INVENTOR.
H. C. A. van DUUREN

BY [signature]

ATTORNEY

United States Patent Office 3,272,921
Patented Sept. 13, 1966

3,272,921

SIMPLEX TELEGRAPH SYSTEM FOR SCANNING ANSWER-BACK SIGNALS

Hendrik Cornelis Anthony van Duuren, Wassenaar, Netherlands, assignor to de Staat der Nederlanden ten Deze Vertegenwoordigd Door de Directeur-Generaal der Posterijen, Telegrafie en Telefonie, The Hague, Netherlands Filed Nov. 1, 1962, Ser. No. 234,746
Claims priority, application Netherlands, Nov. 3, 1961, 271,031/61
14 Claims. (Cl. 178—69)

Figure 1:
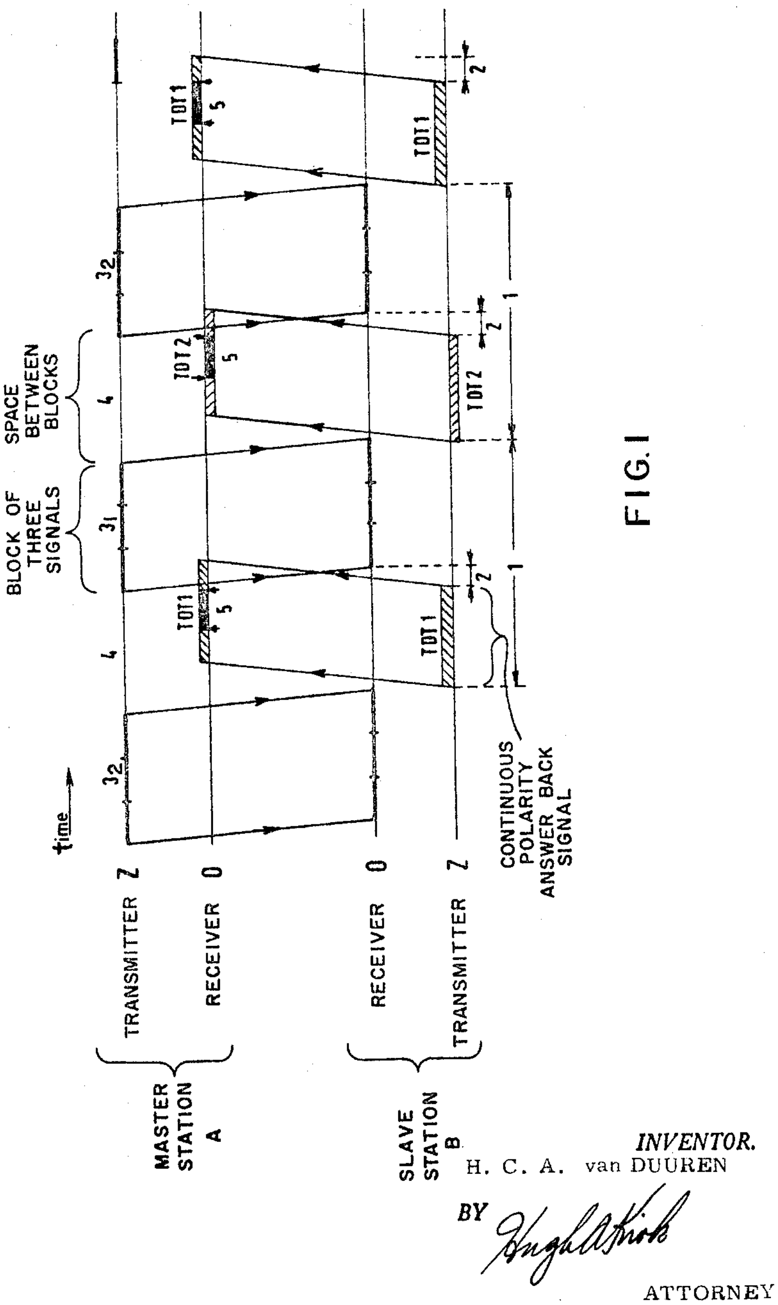

The invention relates to a simplex telegraph installation working with block transmission, and with automatic error correction. More particularly, this invention is of the kind described in the U.S. patent application Serial No. 94,337 filed March 8, 1961, by the applicant, and adapted for ships' traffic.

According to earlier systems synchronization is necessary for the two transmission channels and the transmitters and receivers belonging to them in which answer back signals are used. In consequence thereof the time for starting often is rather long.

In a simplex telegraph system, particularly of the type described in the above identified copending application Serial No. 94,337, message signals are transmitted from a master station to a slave station at spaced intervals and the slave station answers back during the spaces between adjacent message signals that the just received message signal was either correctly or incorrectly received. In order to give this answer-back information, two types of answer-back or special service signals were employed, one requesting the next message signal or signals and the other to request a repetition of the previous signal. Depending upon the transmission time to and from the two stations and the duration of the signals being transmitted and received, the message signals may be sent in groups or blocks of multi-element code signals for a predetermined time and then stopped for an equal period of time, to permit reception of the block at its most remote station plus the time necessary for transmission and reception of the proper special service or answer-back signal. Thus for example the message signals may be sent in groups of three from the master station and then a pause or space was allowed of a time equivalent to the time for sending the block of three signals before the next block of three signals were transmitted. The successive blocks transmitted were associated with two different numbers, such as 1, 2, 1, 2, etc., and the blocks received were similarly associated or counted in order to determine which of the two different answer-back signals was to be sent. For example, the first block of message signals in any message would be associated with the number "1," and if it were correctly received without mutilation, the first answer-back signal would be that corresponding to block number "2," thus requesting the master station to transmit the next block of message signals. If, however, the first block of signals were not properly received, the slave station would continue to send the first answer-back signal number "1," meaning a request for repetition of the first block until it was correctly received.

It is an object of the present invention to simplify such a simplex telecommunication system, as well as reduce the cost of equipment needed at each station thereof.

Generally speaking according to this invention the interval for the reception of the answer-back signal is increased by not using a separate or special multi-element signal, such as one of 7 elements for the answer-back signal, but instead continuously transmitting the answer-back signal to nearly the entire duration of the pause between successive message signals by making the answer-back signal consist of one sustained polarity of two different polarities for the two different types of answer-back signals. Thus by the scanning of this elongated answer-back signal, opposite polarities can be used as the criteria of their nature, so that it becomes possible to ascertain the number of the next or desired group with comparative certainty.

Since this answer-back signal can be transmitted immediately after the reception of a traffic signal and can be done on the same frequency as that on which the received traffic is transmitted, the end of the answer-back polarity must occur some time before the reception of the next traffic signal, in order to give the traffic receiver the opportunity of restoring to normal. Thus the answer-back polarity occurs for a large fraction of the difference between the pause at the information-sending station and the outward and back propagation time, so that at the master or traffic transmitting station this polarity can be scanned at any one of several instants to form the answer-back signal, providing of course this scanning occurs within the said fraction. In other words there is a shifting margin between the period of time of this fraction and that of the scanning thereof by the master station receiver. As a result of this, the synchronization of all of the stations can be limited to the synchronization of the receiver of the information-receiving station by the information-sending transmitter, and no receiver distributor synchronization is necessary in the master station. Thus variations of propagation time are met by the said margin, and in the information-sending station the receiving rhythm can be derived directly and constantly from the transmitting distributor.

The above mentioned and other features and objects of this invention and the manner of attaining them will become more apparent and the invention itself will be understood best by reference to the following description of an embodiment of the invention taken in conjunction with the accompanying drawings, wherein:

FIG. 1 is a schematic time diagram of the unmutilated transmission of three blocks of message signals with alternately opposite polarity answer-back signals transmitted substantially continuously throughout the spaces between said blocks according to this invention.

Figure 2:
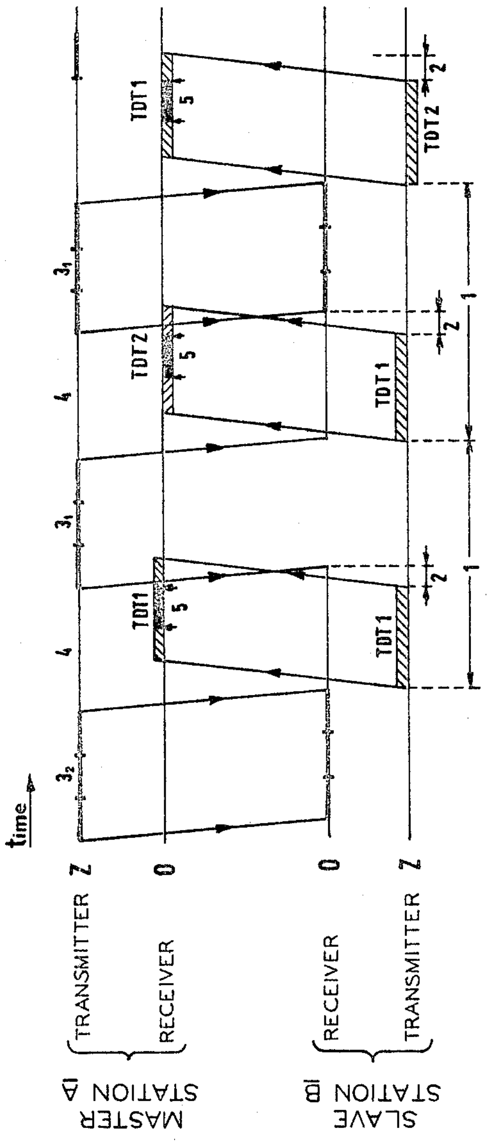
Figure 3:
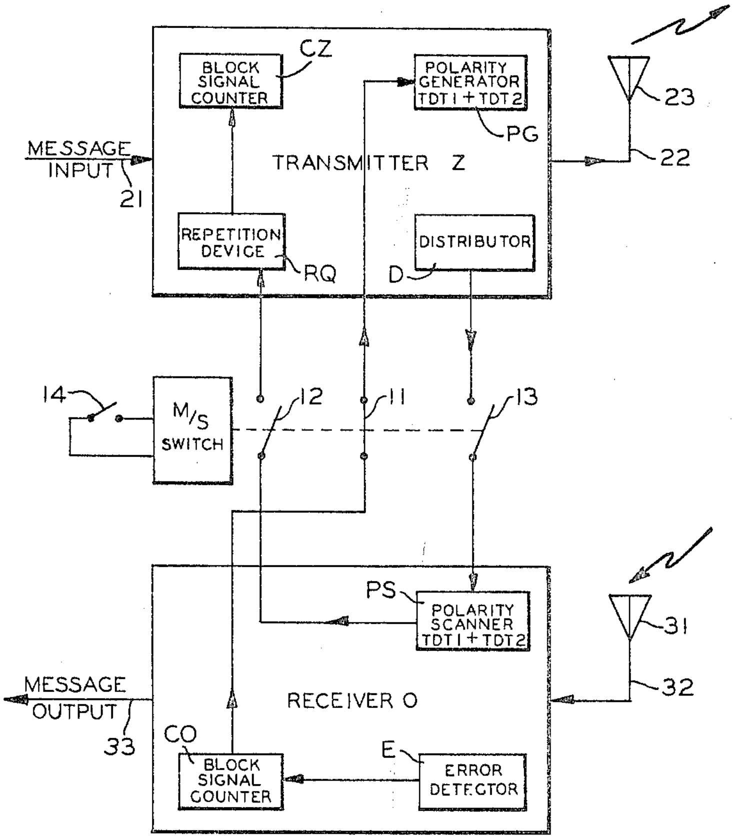

FIG. 2 is a schematic time diagram similar to FIG. 1 showing a mutilation of the second block of message signals and repetition of the first answer-back signal polarity for requesting repetition thereof; and FIG. 3 is a schematic block wiring diagram of a transmitter and receiver circuit at any station according to the present invention disclosing only the parts thereof involved in the novelty of the present invention.

In the schematic time diagrams of FIGS. 1 and 2, the time is plotted horizontally from the left to the right, resp. for the master station A and the slave station B.

Station A transmits a spaced series of traffic blocks $3_2$, $3_1$, $3_2$, $3_1$, etc. and interrupts its transmission during the intermediate pauses 4. Considering the propagation time from station A to station B, the station B after an interval 1 during which it receives the block $3_2$ or $3_1$, transmits an answer-back signal TDT 1 or TDT 2, respectively, according to the nature of the block received. Each answer-back signal is followed by an interval 2, of sufficient duration so that the answer-back signal cannot possibly interfere or delay the transmission of the next block, and to insure the information receiver O at station B will be ready for the next block $3_1$.

In the blackened intervals 5, at the receiver O of the master station A, which end just before the transmission of a next traffic block 3, the information transmitter A considers the frequencies received, which are the criteria of answer-back signals TDT 1 or TDT 2.

Referring now to the schematic block diagram of FIG. 3, there is disclosed for each station a transmitter Z and receiver O connected by conductors having normally closed switch 11 and normally open switches 12 and 13 operated by a master slave control circuit M/S which in turn is controlled by manual switch 14, which switch 14 is only closed when the particular station is to transmit a message and is changed from its normal slave state to the master state, and as a result thereof changing each of the switches 11, 12 and 13 into their other positions than those shown in FIG. 3.

Besides the normal circuits employed in a telegraph transmitter Z in which the message to be transmitted is introduced via conductor 21 and transmitted via conductor 22 over radio antenna 23, there is specifically disclosed in FIG. 3 a repetition device RQ which besides controlling the repetition of the previous block of three signals also is connected for controlling the block signal counter CZ which counts or associates "1" and "2" identifications with groups or blocks of signals $3_1$ and $3_2$ to be transmitted as shown in FIGS. 1 and 2. Also there is disclosed in the transmitter Z a distributor D which controls the timing of the transmission of the blocks of signals $3_1$ and $3_2$ as well as the length of the pauses 4 between these blocks of signals, and according to the present invention, when the station is a master station, this distributor D also synchronizes the scanning of the answer-back signals in its associated receiver when the switch 13 is closed. When the station is a slave station, as all stations normally are maintained so as to be ready to receive signals, there is also provided polarity generators PG for the generation of the two different or opposite polarity answer-back signals TDT 1 and TDT 2. For example, one polarity may be a mark polarity and the other polarity may be a space polarity. These generators PG are controlled to transmit either one or the other polarity via the normally closed switch 11 connecting it with the associated receiver O and operate immediately after the reception of a message and continue to operate for substantially all the time of the pause 4 between the signals. These generators PG are cut off, however, sufficient time 2 before the end of the pauses 4 so that the receiver O will be ready for the reception of the next block of signals, see the time diagrams of FIGS. 1 and 2 wherein the times 4 at the slave station B transmitter Z are diminished by the times 2.

The receiver O at each station, besides having the normal message receiving circuits for receiving the radio blocks of message signals over antenna 31 connected via conductor 32 to the receiver O and then converting these message signals for removal via conductor 33, embodies an error detector E for detecting any mutilation in the blocks of signals as each is received, which detector E in turn controls the block signal counter CO that associates correctly received signals with their corresponding numbers 1 and 2 for correspondingly controlling, through the conductor having the normally closed switch 11, the polarity generators TDT 1 and TDT 2 in the circuit PG in its associated transmitter Z. Also the receiver O contains a polarity scanner PS for scanning the answer-back signals when the receiver is employed in the master station, and the switch 13 is closed. This scanner PS is controlled during the times 5 in FIGS. 1 and 2 from the distributor D in associated transmitter Z, thus eliminating the necessity of another distributor in the receiver circuit O for synchronization purposes. The synchronization of the signal for the times 1 shown in FIGS. 1 and 2 is controlled by the reception of the blocks of signals $3_1$ and $3_2$. Also the polarity scanner PS controls, through switch 12 when closed and operating as a master station, the repetition device RQ for requesting the repetition of a previously transmitted block of message signals, in the event the polarity scanner PS detects a polarity signal corresponding to such a request for repetition. This means that the remote or slave station has received the previously transmitted block of message signals in a mutilated condition.

Thus when the circuit according to FIG. 3 is employed as a master station, switches 12 and 13 are closed and switch 11 is open, so that the distributor D, repetition device RQ and block signal counter CZ in the transmitter Z are operative with the general block message signal transmission circuits. However the polarity generator PG is not employed in that answer-back signals are not sent while this station is used for sending message signals. In this situation, the polarity scanner PS in the associated receiver O is employed for scanning the answer-back signals that are received to determine whether or not a repetition of a previous block of message signals is to be made, or the next signal to be sent, respectively. The other circuits, namely the error detector E and block counter CO in receiver O are not employed when the station is a master station.

On the other hand when the station is employed as a slave station as shown in the full line connections of FIG. 3, then the transmitter Z only transmits the proper polarity answer-back signal TDT 1 or TDT 2 as controlled by the receiver O, which receives not only the full message signals in the normal way, but also checks each signal for errors in the error detector circuit E, which in turn controls the block signal counter CO that associates each signal with a "1" or "2" to control the proper transmission of the plus or minus, mark or space polarity answer-back signals TDT 1 and TDT 2 from the circuit PG in the associated transmitter Z.

Although mechanical switches are shown for the connections between the transmitter Z and receiver O in the circuit of FIG. 3, it is to be understood that these may be controlled electronically without departing from the scope of this invention.

While I have illustrated and described what I regard to be the preferred embodiment of my invention, nevertheless it will be understood that such is merely exemplary and that numerous modifications and rearrangements may be made therein, without departing from the essence of the invention, I claim:

1. In a telecommunication system for transmitting intermittent groups of message signals from one station to another and transmitting answer-back signals from said other station to said one station during the space between the transmission of adjacent groups of message signals, said answer-back signals being of two types and indicating that said other station correctly received the just prior group of message signals and that the next group should now be transmitted, the improvement comprising the steps of:

(A) transmitting the proper one of said answer-back signals from said other station continuously from the end of the reception of each said group of signals to substantially the end of the time between that group and the next adjacent group of signals, and (B) scanning said answer-back signals in said one station for at least a part of said space between the transmission of adjacent message signals.

2. A system according to claim 1 wherein said scanning occurs just prior to the transmission of the next group of message signals by said one station.

3. A system according to claim 1 wherein each said answer-back signal comprises the transmission of a single polarity signal.

4. A system according to claim 3 wherein said two types of answer-back signals are of opposite polarities.

5. In a telecommunication system for transmitting message signals intermittently from one station to another and transmitting answer-back signals from said other station to said one station during the space between the transmission of adjacent message signals, said answer-back signals being of two types and indicating that the message signal just previously received at said other station was not mutilated and the next message signal should be transmitted, the improvement comprising:

(A) means in said other station for continuously transmitting the proper one of said two answer-back signals depending on the unmutilated reception of the just received message signal, immediately after its reception and for the substantial duration of said space between it and the next message signal to be transmitted, and (B) means in said one station for scanning said continuous answer-back signal for a part of said space prior to the transmission of the next message signal.

6. A system according to claim 5 wherein said message signals are transmitted in blocks of equal plurality of signals.

7. A system according to claim 5 wherein said system comprises a simplex telegraph system, and said one station acts as a master station and said other station acts as a slave station.

8. A system according to claim 5 including means at each station for selecting said one station as a master station for transmitting message signals while other station acts as a slave station.

9. A system according to claim 5 wherein said two answer-back signals comprise signals of opposite polarities.

10. A communication system for transmitting spaced blocks of message signals from one station to another, each station comprising:

(I) a transmitter, including:

(A) means for transmitting spaced blocks of said message signals, (B) means for counting said blocks of transmitted message signals to associate alternate blocks with two different criteria, (C) means for generating in each space between adjacent blocks of said message signals one of two continuous answer-back signals corresponding to said two different criteria, (D) means for transmitting and repeating message signals requested to be transmitted and repeated, respectively, according to said answer-back signals, and (E) distributor means for controlling said spacing between the transmission of successive message signals;

(II) a receiver including:

(A) means for receiving said spaced blocks of message signals, (B) means for counting said blocks of received message signals for controlling said answer-back signal generating means in the transmitter at its associated station, (C) means for detecting mutilation of received message signals for controlling said block counting means in said receiver to control said answer-back signal generating means in the associated transmitter to request repetition of the last received block of message signals which contained a detected mutilated signal, by repeating the answer-back signal corresponding to the criteria of said block containing that detected mutilated signal; and (D) means for scanning answer-back signals for controlling said message repeating means at its associated station, said answer-back signal scanning means being controlled by said distributor means at its associated station for scanning said answer-back signals only part of the time of said spacing prior to the transmission of the next block of message signals; and (III) switching means for selecting one station for transmitting said message signals and scanning said answer-back signals, and for selecting said other station for receiving said message signals and transmitting said answer-back signals;

whereby said selected one station alternately transmits blocks of message signals and said selected other station automatically transmits answer-back signals in between each block of message signals, which answer-back signals are alternately transmitted in the spaces between said blocks of message signals so long as said message signals are correctly received, however, if an error is detected in the message signals of one block then the same answer-back signal which was previously transmitted before that block was received and detected to be mutilated, is repeated so that the selected one station will know that that block was erroneously received and that it should be repeated, in that the counting means in the transmitter and receiver of each station correspondingly associate alternate blocks of signals with alternate ones of the two different answer-back signals, so that an answer-back signal is received between each block of signals.

11. A system according to claim 10 wherein said message signals are sent in blocks of equal plurality of signals.

12. A simplex telegraph system according to claim 10 wherein said message signals comprise blocks of three telegraph signals.

13. A system according to claim 10 wherein said two different answer-back signals comprise signals of opposite polarity.

14. A system according to claim 10 wherein said blocks and said spaces are of substantially equal time durations.

References Cited by the Examiner

UNITED STATES PATENTS

| | | | |
|---|---|---|---|
| 2,988,596 | 6/1961 | Van Dalen | 178—23.1 |
| 3,001,018 | 9/1961 | Van Dalen | 178—23.1 |
| 3,131,377 | 4/1964 | Grondin | 178—23.1 |

NEIL C. READ, *Primary Examiner.*

MALCOLM S. MORRISON, *Examiner.*

S. DAVID, T. A. ROBINSON, *Assistant Examiners.*